United States Patent
Hong et al.

(10) Patent No.: US 9,703,408 B2
(45) Date of Patent: Jul. 11, 2017

(54) APPARATUS AND METHOD FOR ADJUSTING A TOUCH RECOGNITION AREA IN A TOUCH INTERFACE

(71) Applicant: Samsung Electronics Co., Ltd., Gyeonggi-do (KR)

(72) Inventors: Hyun-Su Hong, Gyeonggi-do (KR); Woo-Jin Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 159 days.

(21) Appl. No.: 13/743,953

(22) Filed: Jan. 17, 2013

(65) Prior Publication Data

US 2013/0181924 A1 Jul. 18, 2013

(30) Foreign Application Priority Data

Jan. 17, 2012 (KR) ........................ 10-2012-0005131

(51) Int. Cl.
*G06F 3/041* (2006.01)
*G06F 3/0488* (2013.01)

(52) U.S. Cl.
CPC .......... *G06F 3/0412* (2013.01); *G06F 3/0416* (2013.01); *G06F 3/0488* (2013.01); *G06F 2203/04101* (2013.01)

(58) Field of Classification Search
CPC .... G06F 3/0488; G06F 3/0412; G06F 3/0418; G06F 3/044; G06F 3/0416
USPC ...................... 345/173–178; 178/18.01–18.11
See application file for complete search history.

(56) References Cited

U.S. PATENT DOCUMENTS

| | | | | |
|---|---|---|---|---|
| 5,565,894 A | * | 10/1996 | Bates et al. | 345/178 |
| 5,627,567 A | * | 5/1997 | Davidson | G06F 3/0488 345/170 |
| 7,154,483 B2 | * | 12/2006 | Kobayashi | 345/173 |
| 2009/0201246 A1 | * | 8/2009 | Lee | G06F 1/1626 345/156 |
| 2009/0219255 A1 | * | 9/2009 | Woolley | G06F 3/0416 345/173 |
| 2009/0289914 A1 | * | 11/2009 | Cho | 345/173 |
| 2009/0315848 A1 | | 12/2009 | Ku et al. | |
| 2010/0127997 A1 | * | 5/2010 | Park et al. | 345/173 |
| 2010/0177121 A1 | * | 7/2010 | Homma | G06F 3/0416 345/659 |
| 2010/0259504 A1 | | 10/2010 | Doi et al. | |
| 2010/0271307 A1 | * | 10/2010 | Yen | G06F 3/0423 345/168 |
| 2012/0206349 A1 | * | 8/2012 | Nowatzyk et al. | 345/158 |
| 2012/0299864 A1 | * | 11/2012 | Tong | G06F 3/044 345/174 |

FOREIGN PATENT DOCUMENTS

| | | |
|---|---|---|
| KR | 1020080029028 | 4/2008 |
| KR | 1020090120774 | 11/2009 |
| KR | 1020100001601 | 1/2010 |

* cited by examiner

*Primary Examiner* — Nichols Lee
(74) *Attorney, Agent, or Firm* — The Farrell Law Firm, P.C.

(57) ABSTRACT

An apparatus and method are provided for adjusting a touch recognition area on a touch interface. The method includes displaying an item on a screen of a terminal; sensing an approach area according to an approach of a user input object to the touch interface; determining an approach direction of the user input object, based on the approach area; and adjusting a touch recognition area of the item, based on the approach direction.

17 Claims, 5 Drawing Sheets

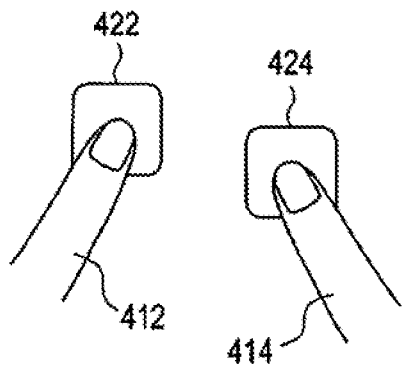
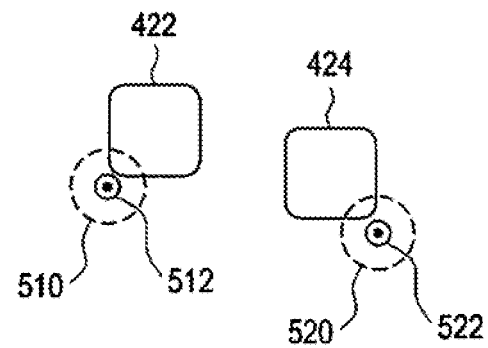
FIG.5A
(PRIOR ART)
FIG.5B
(PRIOR ART)
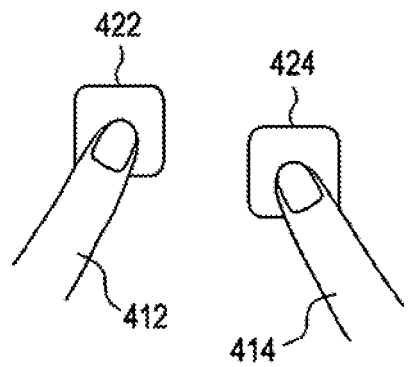
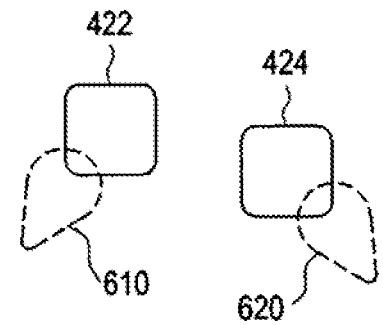
FIG.6A
FIG.6B

APPARATUS AND METHOD FOR ADJUSTING A TOUCH RECOGNITION AREA IN A TOUCH INTERFACE

PRIORITY

This application claims priority under 35 U.S.C. §119(a) to Korean Patent Application Serial No. 10-2012-0005131, which was filed in the Korean Intellectual Property Office on Jan. 17, 2012, the entire content of which is hereby incorporated by reference.

BACKGROUND OF THE INVENTION

1. Field of the Invention

The present invention relates generally to a touch interface, and more particularly, to an apparatus and method for adjusting a touch recognition area in a touch interface.

2. Description of the Related Art

A conventional electrostatic capacity type touch interface senses a change in capacitance of a relevant part of a touch panel, which is caused by a user input touch (for example, using a finger or a stylus), finds a geometric center point of a touch area, and determines the geometric center point of the touch area as a point touched by the user. However, portable apparatuses including touch interfaces often have relatively small screens. Accordingly, when a user presses the touch interface screen with a finger to select an item on a screen, e.g., from a web page, where many selectable items are displayed, the user often selects a different nearby item, instead of the intended item, which inconveniences the user.

As described above, a conventional touch interface determines coordinates of a geometric center of a touch area as a touch input spot, without regard to the characteristics of the shape of the user input object (for example, a finger or a stylus), the posture thereof, etc. Therefore, incorrect selections of items frequently occur.

SUMMARY OF THE INVENTION

The present invention is designed to address at least the problems and/or disadvantages described above and to provide at least the advantages described below.

Accordingly, an aspect of the present invention is intended to provide a method for recognizing an approach direction, a shape, and a trajectory of a user input object and selecting an intended touch spot, when the user input object approaches a touch interface, based on the recognized approach direction, shape, and trajectory of the user input object.

In accordance with an aspect of the present invention, a method for adjusting a touch recognition area on a touch interface is provided. The method includes displaying an item on a screen of a terminal; sensing an approach area according to an approach of a user input object to the touch interface; determining an approach direction of the user input object, based on the approach area; and adjusting a touch recognition area of the item, based on the approach direction.

In accordance with an aspect of the present invention, a portable terminal including a touch interface is provided. The portable terminal includes a touch interface that displays an item on a screen, and senses an approach area according to an approach of a user input object to the screen; and a controller that determines an approach direction of the user input object based on the approach area, and controls the touch interface to adjust a touch recognition area of the item, based on the approach direction.

BRIEF DESCRIPTION OF THE DRAWINGS

The above and other features, aspects, and advantages of certain embodiments of the present invention will be more apparent from the following detailed description taken in conjunction with the accompanying drawings, in which:

FIGS. 5A-5B illustrate touch areas of touch inputs in a conventional touch screen device;

FIGS. 6A-6B illustrate approach areas of touch inputs according to an embodiment of the present invention;

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
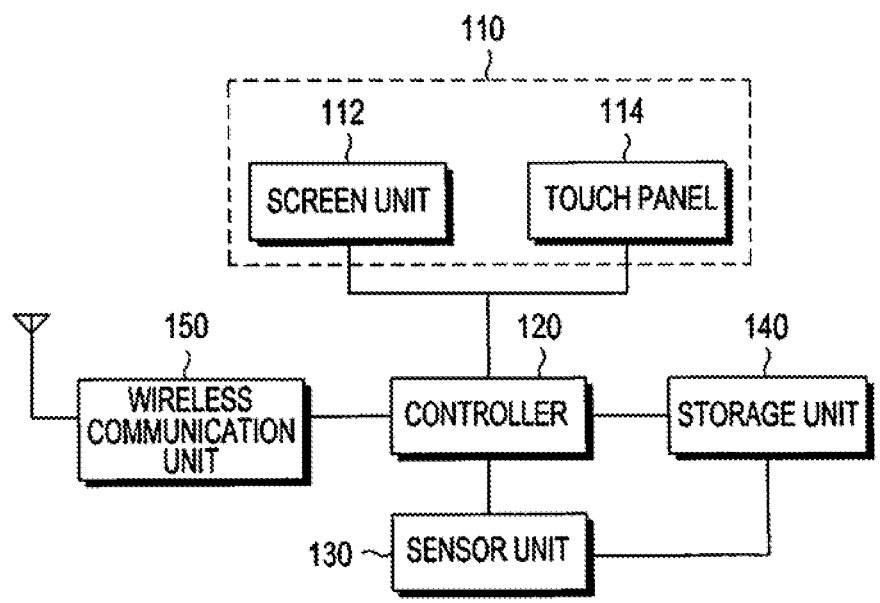
FIG. 1 illustrates a portable communication terminal according to an embodiment of the present invention.

FIG. 1 illustrates a portable communication terminal according to an embodiment of the present invention.

Referring to FIG. 1, the portable communication terminal includes a touch interface 110, a controller 120, a sensor unit 130, a storage unit 140, and a wireless communication unit 150. Herein the term "unit" refers to hardware device or a combination of a hardware device and software.

The touch interface 110 includes a screen unit 112 and a touch panel 114, and may also be referred to as a "touch screen." The screen unit 112 may also be referred to as a "display unit." In this example, the portable communication terminal is described as an example, but the present invention may also be applied to any device that includes a touch interface.

The screen unit 112 displays an image, and may embodied as a Plasma Display Panel (PDP), a Liquid Crystal Display (LCD), an Organic Light Emitting Diode (OLED), a Light Emitting Diode (LED), etc.

The touch panel 114 is disposed on the screen unit 112. A user touches various executable items displayed on a surface of the touch interface 110 (namely, the surface of the touch panel 114), and selects an item, i.e., enables the execution of an application or a link page related to the item.

The touch panel 114 is disposed on a surface of the portable communication terminal, and the screen unit 112 is disposed below the touch panel 114. An image generated by the screen unit 112 is displayed to the user through the transparent touch panel 114. For example, items include an icon, a picture, a menu, a link to a web page, and etc.

The touch panel 114 is an electrostatic capacity-type touch panel. Accordingly, when a user's finger touches the surface of the touch panel 114, or when the user's finger does not directly touch the surface of the touch panel 114 but approaches within a predetermined distance from the touch panel 114, the touch panel 114 may sense multiple touch points or multiple approach points, and may extract information on the shape or surface area of a touch area corresponding to the touch points, or information on the shape or surface area of an approach area possessed by the approach points.

Figure 2:
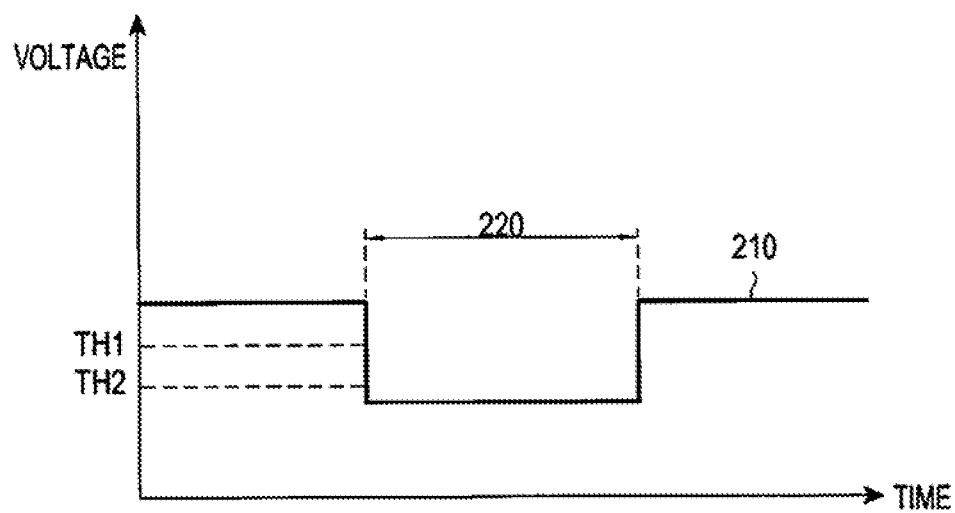
FIG. 2 is a graph illustrating a method for recognizing an approach point by a touch panel according to an embodiment of the present invention.

FIG. 2 is a graph illustrating a method for recognizing an approach point by a touch panel according to an embodiment of the present invention.

Referring to FIG. 2, when a user input object, e.g., a finger or a stylus, touches or approaches the touch panel 114, during a time interval 220 matched to a touch or approach position, a voltage of a sensing signal 210 of the touch panel 114 drops. When the user input object touches the touch panel 114 a larger degree of drop from a reference voltage occurs than when the user input object merely approaches the touch panel 114.

More specifically, the touch panel 114 compares a voltage of a sensing signal 210 with a second threshold (TH2). When the voltage of the sensing signal 210 is less than or equal to the second threshold, the touch panel 114 determines that the user input object has touched the touch panel 114.

In accordance with an embodiment of the present invention, a first threshold (TH1), which is less than the second threshold, is set, and the voltage of the sensing signal 210 of the touch panel 114 is compared with the first and second thresholds. When the voltage of the sensing signal 210 of the touch panel 114 is less than or equal to the first threshold and is greater than the second threshold, it is determined that the user input object has approached the touch panel 114.

The controller 120, which is a Central Processing Unit (CPU), controls an overall operation of the portable communication terminal.

The sensor unit 130 senses a position, bearing, and movement of the portable communication terminal. The sensor unit 130 includes at least one of an accelerometer sensor, a gravity sensor, a shock sensor, a Global Positioning System (GPS), and a compass sensor.

The storage unit 140 stores an operating system of the portable communication terminal, various applications thereof, information that is input to the portable communication terminal, information generated in the portable communication terminal, etc. For example, a non-volatile memory may be used as the storage unit 140.

The wireless communication unit 150 wirelessly transmits data from the controller 120, or wirelessly receives data from a counterpart apparatus and delivers the received data to the controller 120.

Figure 3:
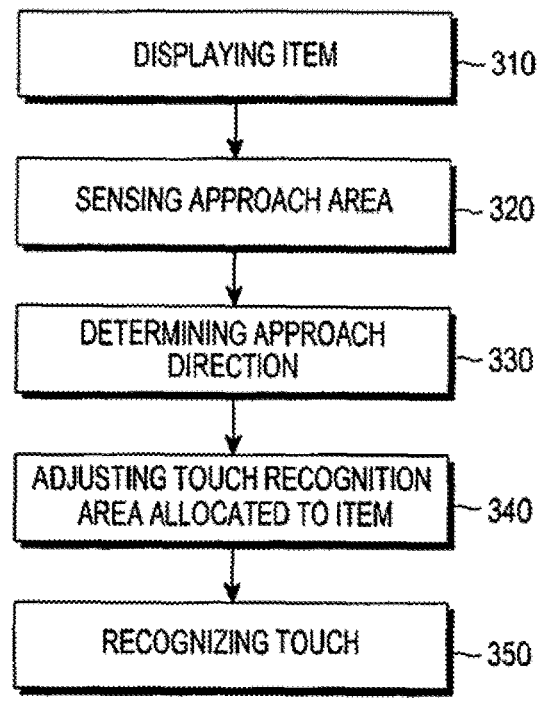
FIG. 3 is a flowchart illustrating a method for providing a touch interface according to an embodiment of the present invention.

FIG. 3 is a flowchart illustrating a method for providing a touch interface according to an embodiment of the present invention.

Referring to FIG. 3, an item is displayed in step 310. More specifically, in step 310, the controller 120 performs a control operation for displaying multiple items, which may be selected or executed, on a screen of the portable communication terminal.

In step 320, an approach area is sensed, and in step 330, an approach direction is determined. In step 340, a touch recognition area allocated to an item is adjusted, and a touch input is recognized in step 350.

Figure 4:
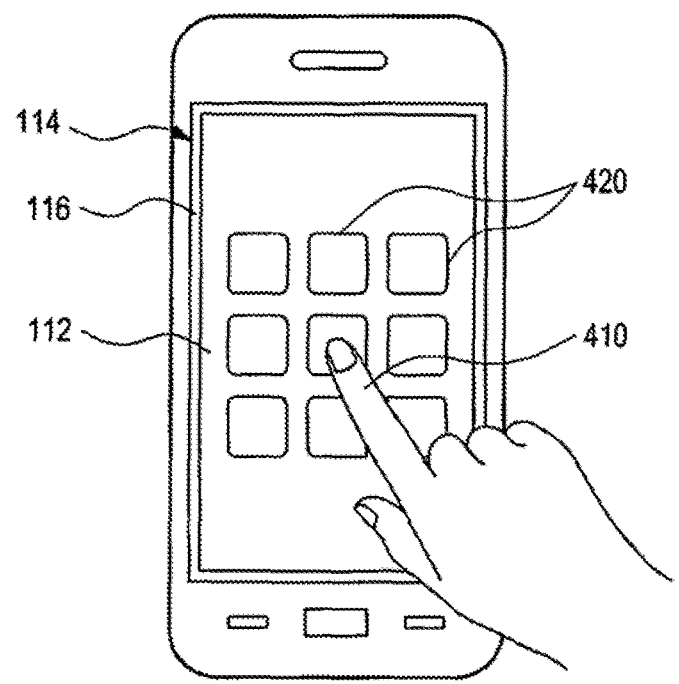
FIG. 4 illustrates a front surface of a portable communication terminal according to an embodiment of the present invention.

FIG. 4 illustrates a front surface of a portable communication terminal according to an embodiment of the present invention.

Referring to FIG. 4, Multiple items 420, which may be selected or executed by a user input object 410, i.e., a finger, are displayed on a screen 116 of the portable communication terminal, and the items 420 are associated with different applications of the portable communication terminal, respectively. For example, the applications may be a telephone application, a telephone directory, a messaging application, a game, Digital Multimedia Broadcasting, etc. The user may select the items 420, may execute an editing menu of the items 420, or may execute an application associated with one of the items 420.

In step 320 of FIG. 3, the touch panel 114 senses an approach area formed by the user input object 410, as it approaches one of the multiple items 420 displayed on the screen 116 of the portable communication terminal.

FIGS. 5A-5B illustrate touch areas of touch inputs in a conventional touch screen device.

Referring to FIG. 5A, illustrates user input objects 412 and 414, i.e., fingers, which touch items 422 and 424, respectively. Most users select an item while identifying text or a picture displayed in order to indicate the item, and thus, tend to touch an edge part of the item. Namely, when a finger on a user's right hand is used, most users touch a right edge part of the item. Similarly, when a finger on a user's left hand is used, most users touch a left edge part of the item.

Referring to FIG. 5B, when the user input objects 412 and 414 touch the touch panel 114, the touch panel 114 senses multiple touch points, and the controller 120 determines coordinates 512 and 522 of geometric centers of touch areas 510 and 520, in which the touch points are distributed, as touch spots. The user has touched the touch panel 114 with the intention of executing the items 422 and 424, but the coordinates 512 and 522 of the centers of the touch points deviate from the items 422 and 424. Accordingly, items 422 and 424 fail to be selected or executed.

FIGS. 6A-6B illustrate approach areas of touch inputs according to an embodiment of the present invention.

Referring to FIG. 6A, the user input objects 412 and 414 approach items 422 and 424, respectively.

Referring to FIG. 6B, when the user input objects 412 and 414 approach the touch panel 114, the touch panel 114 senses multiple approach points, and the controller 120 senses approach areas 610 and 620, in which the approach points are distributed.

In step 330 of FIG. 3, the controller 120 calculates an approach direction of a user input object 412 or 414 by using at least one of an outer shape of an approach area in which the approach points are distributed, a density distribution in the approach area, and a movement trajectory of the approach area (or center coordinates of the approach area).

Figure 7A:
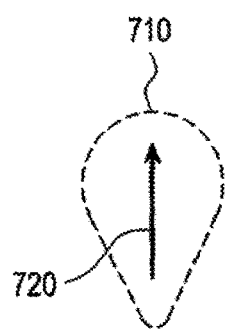
FIGS. 7A-7C illustrate a method for calculating an approach direction vector of a touch input according to an embodiment of the present invention.
Figure 7B:
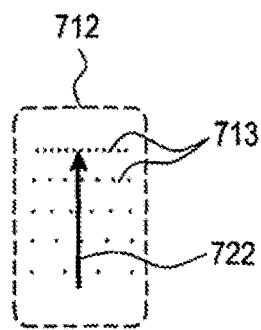
Figure 7C:
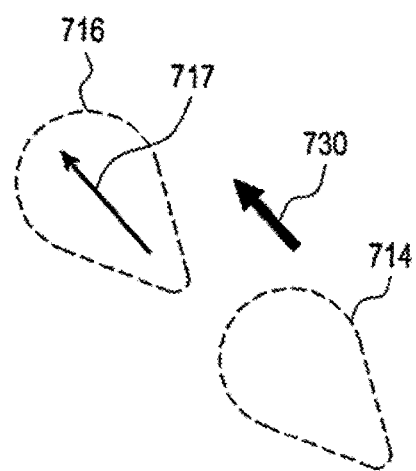

FIGS. 7A-7C illustrate a method for calculating an approach direction vector of a touch input according to an embodiment of the present invention.

Referring to FIG. 7A, the controller 120 calculates an approach direction vector 720 of the user input object based on an outer shape of an approach area 710 in which approach points are distributed. The storage unit 140 stores patterns of approach areas that the user input object may have, and the controller 120 may calculate an approach direction vector through pattern matching.

More specifically, the controller 120 detects a pattern similar to the sensed approach area among patterns of approach areas that have previously been stored in the storage unit 140, and rotates an approach direction vector 720 previously defined by the detected pattern according to the bearing of the sensed approach area 710. Accordingly, the controller 120 may calculate an approach direction vector 720 of the sensed approach area 710.

The approach direction vector 720 may have a size proportional to the size (or length) of the sensed approach area 710, or may have a unit size such as 1. Although FIG. 7A illustrates the calculation of an approach direction vector 720 as an example for determining an approach direction of the user input object, an approach direction vector does not have to be calculated.

As illustrated in FIG. 7A, the approach area 710 has a shape of a water drop or comet having a wide head part and a narrow tail part, and the approach direction vector 720 pointing from the tail part to the head part may be calculated. The shape of the approach area 710 may result from the shape of the user input object or a tilt angle of the user input object.

Referring to FIG. 7B, the controller 120 calculates an approach direction vector 722 of the user input object based on a density distribution in an approach area 712. The density distribution of approach points 713 in the approach area 712 may be in the form of a dense part and a loose part, and the approach direction vector 722 pointing from the loose part to the dense part may be calculated. The form of the approach area 712 may result from the tilt angle of the user input object.

Referring to FIG. 7C, the controller 120 calculates an approach direction vector 717 of the user input object based on a movement trajectory 730 of approach areas 714 and 716 (or center coordinates of an approach area). The controller 120 tracks an approach area by previously set periods, and thereby detects a movement trajectory of the approach area. For example, the controller calculates the approach direction vector 717 of the current approach area 716 based on displacement between the previous approach area 714 and the current approach area 716. Center coordinates of an approach area may be set as coordinates of a geometric center (for example, the center of a circle) of the approach area, center coordinates to which a weight is applied (center coordinates reflecting the density of approach points similarly to the conventional center of gravity), or an end point (namely, a head end part of a shown arrow) of an approach direction vector.

The controller 120 estimates a tilt angle of the user input object based on a pattern, length, density distribution, and movement trajectory of an approach area, and may calculate a three-dimensional approach direction vector that is based on the form of the approach area and the tilt angle of the user input object. Specifically, the three-dimensional approach direction vector may be expressed by a direction and an angle in a state where it has a unit size.

When the approach direction vector has a size proportional to the length (or size) of the approach area, the size of the approach direction vector may represent information on a tilt angle of the user input object.

For example, when the user input object approaches in a direction perpendicular to the touch panel 114, a pattern of an approach area may represent a perpendicular approach, the approach area may have a length less than or equal to a previously-set value, the approach area may have a size which gradually increases with the elapse of time, or a density distribution of approach points in the approach area may gradually increase. The controller 120 may sense changes in the size, the density distribution, etc., and then calculate a three-dimensional approach direction vector (for example, a vector perpendicular to the touch panel 114).

In step 340 of FIG. 3, the controller 120 adjusts the touch recognition area to the side of the approach area based on the approach direction of the user input object. For example, the controller 120 extends the touch recognition area in a direction opposite to the approach direction of the user input object. In order to enable the user to easily identify an extended touch recognition area, the controller 120 may display an extended part of the touch recognition area. Herein, the extension is illustratively described as the adjustment of the touch recognition area. However, examples of the adjustment of the touch recognition area may include changes in shape, such as the extension and the prolongation of one part (for example, a change in shape from a square to a rectangle, and a change in shape from a rectangle to an ellipse), position movement, a combination of the change in shape and the position movement, etc.

Figure 8A:
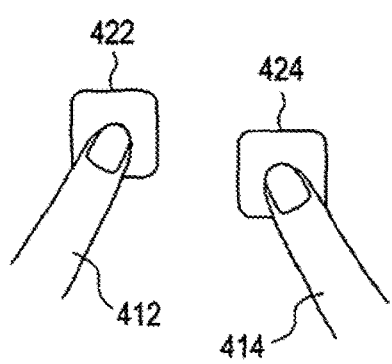
FIGS. 8A-8B illustrate extensions of touch recognition areas of touch inputs according to an embodiment of the present invention.
Figure 8B:
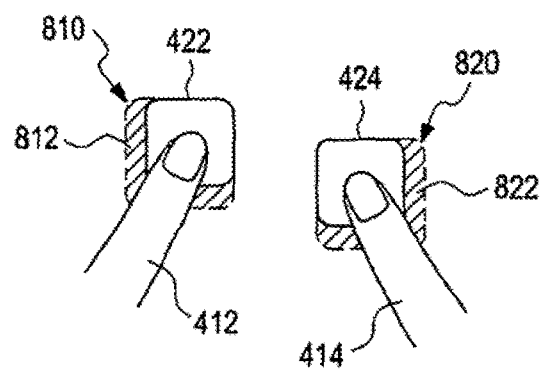

FIGS. 8A-8B illustrate extensions of touch recognition areas of touch inputs according to an embodiment of the present invention.

Referring to FIG. 8A, the user input objects 412 and 414 approach the items 422 and 424, respectively.

Referring to FIG. 8B, the controller 120 extends a touch recognition area, which is allocated to each of the items 422 and 424, in a direction opposite to an approach direction of each of the user input objects 412 and 414. A touch recognition area, before being extended, which has a shape and a surface area identical or similar to the shape and surface area of each of the items 422 and 424, is extended while it maintains the shape (namely, a quadrangle having rounded corners) of each of the items 422 and 424. Further, each of the extended touch recognition areas 810 and 820 includes an existing touch recognition part occupied by each of the items 422 and 424, and each of extended touch recognition parts 812 and 822, which is extended in a direction opposite to an approach direction of each of the user input objects 412 and 414.

A touch recognition area may be extended in various forms. However, it is desirable that the touch recognition area is extended so as to include center coordinates of an approach area.

FIGS. 9A-9D illustrate extended touch recognition areas of touch inputs according to an embodiment of the present invention.

Figure 9A:
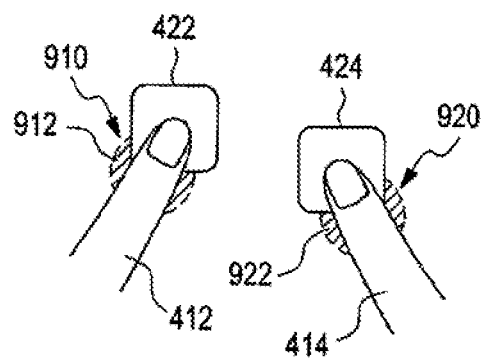
FIGS. 9A-9D illustrate extended touch recognition areas of touch inputs according to an embodiment of the present invention.

Referring to FIG. 9A, each of extended touch recognition areas 910 and 920 includes an existing touch recognition part occupied by each of the items 422 and 424, and extended touch recognition parts 912 and 922, which are extended in a direction opposite to an approach direction of each of the user input objects 412 and 414, and which have the shape of a circle or an ellipse.

Figure 9B:
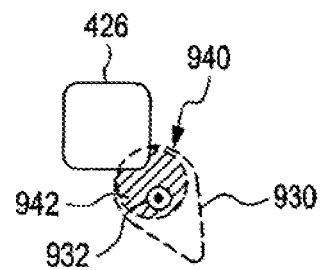

Referring to FIG. 9B, an extended touch recognition area 940 includes an existing touch recognition part occupied by an item 426, and an extended touch recognition part 942 that is extended to include center coordinates 932 of an approach area 930.

Figure 9C:
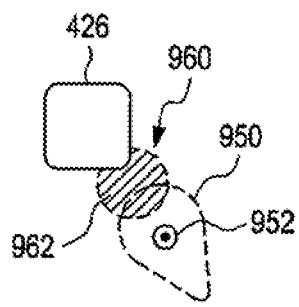

Referring to FIG. 9C, an approach area 950 does not overlap an existing touch recognition part occupied by the item 426, an extended touch recognition area 960 does not include center coordinates 952 of the approach area 950, and the extended touch recognition area 960 includes the existing touch recognition part occupied by the item 426 and an extended touch recognition part 962 which is extended to at least partially overlap the approach area 950.

Figure 9D:
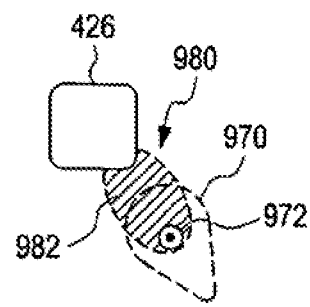

Referring to FIG. 9D, an approach area 970 does not overlap an existing touch recognition part occupied by the item 426, and an extended touch recognition area 980 includes the existing touch recognition part occupied by the item 426 and an extended touch recognition part 982, which is extended to include center coordinates 972 of the approach area 970.

In step 350 of FIG. 3, when the user input object touches the touch panel 114 and a touch spot determined as center coordinates is located in an extended touch recognition area, the controller 120 may cause the extended touch recognition area to select an allocated item, or may execute an editing menu of the item, or may execute an application associated with the item.

In accordance with the above-described embodiments of the present invention, when the touch recognition area is adjusted according to the approach direction of the user input object (for example, finger or stylus), a success rate of selection by a touch is improved more than where a uniform touch recognition area is fixed.

The above-described embodiments of the present invention provide apparatuses and methods for variably adjusting a touch recognition area in view of situational characteristics, for the touch of a finger for performing an input operation, which accurately reflects the intention of a user, in a touch interface for performing the input operation by the touch of the finger. Accordingly, the above-described embodiments of the present invention have advantages in that they can provide a user with a user interface having improved usability, which enables the user to more easily select a desired item or allows the desired item to be more easily executed, and can be applied to all apparatus each including a touch interface.

It will be appreciated that the above-described embodiments of the present invention may be implemented in the form of hardware or a combination of hardware and software. Any such software may be stored in a volatile or non-volatile storage device such as a Read-Only Memory (ROM), or in a memory such as a Random Access Memory (RAM), a memory chip, a memory device or a memory integrated circuit, or in a storage medium, such as a Compact Disc (CD), a Digital Versatile Disc (DVD), a magnetic disk or a magnetic tape, which is optically or magnetically recordable and simultaneously, is readable by a machine, regardless of whether the software can be deleted or rewritten. It will be appreciated that a storage unit is an example of a machine-readable storage medium suitable for storing a program or programs including instructions for implementing the exemplary embodiments of the present invention. Accordingly, the present invention includes a program including a code for implementing a method claimed in any claim of this specification, and a machine-readable storage medium for storing this program. Also, this program may be electronically conveyed via any medium such as a communication signal transmitted through a wired or wireless connection, and the present invention suitably includes equivalents of this program.

While the present invention has been shown and described with reference to certain embodiments thereof, it will be understood by those skilled in the art that various changes in form and details may be made therein without departing from the spirit and scope of the present invention.

Therefore, the spirit and scope of the present invention is not limited to the described embodiments thereof, but is defined by the appended claims and equivalents thereof.

What is claimed is:

1. A method for adjusting a touch recognition area on a touch interface, the method comprising:
    displaying an item having a first shape on a screen of a terminal;
    sensing an approach area on a touch interface of the terminal according to an approach of a user input object to the item on the touch interface; and
    adjusting a touch recognition area of the item, while maintaining the first shape, a size and a position of the item,
    wherein adjusting the touch recognition area of the item includes changing a shape of the touch recognition area from the first shape to a second shape while moving the touch recognition area, and
    wherein the adjusted touch recognition area has the second shape different from the first shape of the item, and the second shape of the adjusted touch recognition part is displayed along with the item.

2. The method of claim 1, wherein the touch recognition area of the item is adjusted to at least partially overlap the approach area.

3. The method of claim 1, wherein the touch recognition area of the item is adjusted to include center coordinates of the approach area.

4. The method of claim 1, further comprising recognizing that the user input object touches the adjusted touch recognition area.

5. The method of claim 1, further comprising:
    comparing a sensing signal generated by the approach or a touch of the user input object to the touch interface with first and second thresholds; and
    determining that the user input object approaches the touch interface, without touching the touch interface, when a voltage of the sensing signal is less than or equal to the second threshold and is greater than the first threshold.

6. A non-transitory machine-readable storage medium for recording a program for executing a method for adjusting a touch recognition area on a touch interface, the method comprising:
    displaying an item having a first shape on a screen of a terminal;
    sensing an approach area on a touch interface of the terminal according to an approach of a user input object to the item on the touch interface; and
    adjusting a touch recognition area of the item, while maintaining the first shape, a size and a position of the item,
    wherein adjusting the touch recognition area of the item includes changing a shape of the touch recognition area from the first shape to a second shape while moving the touch recognition area, and
    wherein the adjusted touch recognition area has the second shape different from the first shape of the item, and the second shape of the adjusted touch recognition part is displayed along with the item.

7. An apparatus including a touch interface, the apparatus comprising:
    a touch interface that displays an item having a first shape on a screen, and senses an approach area according to an approach of a user input object to the item on the screen; and
    a controller configured to:

control the touch interface to adjust a touch recognition area of the item, while maintaining the first shape, a size and a position of the item itself,
wherein the controller is further configured to change a shape of the touch recognition area from the first shape to a second shape while moving the touch recognition, and
wherein the adjusted touch recognition area has the second shape different from the first shape of the item, and the second shape of the adjusted touch recognition part is displayed along with the item.

8. The apparatus of claim 7, wherein the touch interface compares a sensing signal generated by the approach or a touch of the user input object to the touch interface with first and second thresholds, and determines that the user input object approaches the touch interface, without touching the touch interface, when a voltage of the sensing signal is less than or equal to the second threshold and is greater than the first threshold.

9. The method of claim 1, further comprising:
estimating a tilt angle of the user input object with respect to a surface of the touch interface based on a shape of the approach area; and
calculating a three-dimensional approach direction vector which represents an approach direction of the user input object and includes a vector component perpendicular to the surface of the touch interface, based on a movement trajectory of the approach area and the tilt angle of the user input object.

10. The method of claim 9, wherein estimating the tilt angle of the user input object with respect to the surface of the touch interface based on the shape of the approach area includes:
detecting a pattern matching the sensed approach area from among patterns of approach areas stored in a memory of the terminal; and
estimating the tilt angle of the user input object with respect to the surface of the touch interface based on the detected pattern.

11. The method of claim 1, wherein the first shape is a rectangular shape and the second shape is a circular shape or an elliptical shape.

12. The non-transitory machine-readable storage medium of claim 6, wherein the method further comprises:
estimating a tilt angle of the user input object with respect to a surface of the touch interface based on a shape of the approach area; and
calculating a three-dimensional approach direction vector which represents an approach direction of the user input object and includes a vector component perpendicular to the surface of the touch interface, based on a movement trajectory of the approach area and the tilt angle of the user input object.

13. The non-transitory machine-readable storage medium of claim 12, wherein estimating the tilt angle of the user input object with respect to the surface of the touch interface based on the shape of the approach area includes:
detecting a pattern matching the sensed approach area from among patterns of approach areas stored in a memory of the terminal; and
estimating the tilt angle of the user input object with respect to the surface of the touch interface based on the detected pattern.

14. The non-transitory machine-readable storage medium of claim 6, wherein the first shape is a rectangular shape and the second shape is a circular shape or an elliptical shape.

15. The apparatus of claim 7, wherein the controller is further configured to:
estimate a tilt angle of the user input object with respect to a surface of the touch interface based on a shape of the approach area; and
calculate a three-dimensional approach direction vector which represents an approach direction of the user input object and includes a vector component perpendicular to the surface of the touch interface, based on a movement trajectory of the approach area and the tilt angle of the user input object.

16. The apparatus of claim 15, wherein the controller is further configured to:
detect a pattern matching the sensed approach area from among patterns of approach areas stored in a memory of the terminal; and
estimate the tilt angle of the user input object with respect to the surface of the touch interface based on the detected pattern.

17. The apparatus of claim 7, wherein the first shape is a rectangular shape and the second shape is a circular shape or an elliptical shape.

* * * * *